(12) United States Patent
Wang et al.

(10) Patent No.: US 8,811,145 B2
(45) Date of Patent: Aug. 19, 2014

(54) DETECTION METHOD AND APPARATUS FOR MULTIPLE-INPUT MULTIPLE-OUTPUT SINGLE CARRIER BLOCK TRANSMISSION SYSTEM

(75) Inventors: Wenjin Wang, Shenzhen (CN); Shaoqing Chen, Shenzhen (CN); Xiqi Gao, Shenzhen (CN); Long Qin, Shanghai (CN); Dongming Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 13/544,640

(22) Filed: Jul. 9, 2012

(65) Prior Publication Data

US 2012/0327757 A1 Dec. 27, 2012

Related U.S. Application Data

(63) Continuation of application No. PCT/CN2010/079852, filed on Dec. 16, 2010.

(30) Foreign Application Priority Data

Jan. 8, 2010 (CN) .......................... 2010 1 0033682

(51) Int. Cl.
H04J 11/00 (2006.01)
(52) U.S. Cl.
USPC .......................................... 370/208; 375/232
(58) Field of Classification Search
USPC .................................................. 370/203, 208
See application file for complete search history.

(56) References Cited

U.S. PATENT DOCUMENTS 7,945,008 B2 * 5/2011 Milliner et al. ............... 375/367
8,306,139 B2 * 11/2012 Milliner et al. ............... 375/267
(Continued)

FOREIGN PATENT DOCUMENTS

| CN | 1968238 A | 5/2005 |
|---|---|---|
| CN | 1674482 A | 9/2005 |

(Continued)

OTHER PUBLICATIONS

Chinese Office Action issued in corresponding Chinese Patent Application No. 201010033682.8 issued Sep. 4, 2012.

(Continued)

*Primary Examiner* — Chi Pham
*Assistant Examiner* — Fahmida Chowdhury
(74) *Attorney, Agent, or Firm* — Staas & Halsey LLP

(57) ABSTRACT

The present invention discloses a detection method, a receiver, and an apparatus in a multiple-input multiple-output single-carrier block transmission system. Through sorted QR decomposition (Sorted QR Decomposition, SQRD) decomposition based on a minimum mean squared error (Minimum Mean Squared Error, MMSE) criterion, an matrix inverse operation in minimum mean squared error equalization is avoided, and complexity is significantly reduced. In addition, through layer-by-layer soft interference cancellation detection after the SQRD decomposition and further iterative processing, better detection performance may be obtained. Especially, inter-stream interference suppression may be performed in first iteration. Compared with a conventional parallel iterative soft interference cancellation detection algorithm, with the same number of times of iteration, especially under the limit that a receiver can only support a small number of times of iteration, the inter-stream interference suppression has more evident advantages, and an advantage in the aspect of cost performance is very obvious.

19 Claims, 8 Drawing Sheets

(56) References Cited

U.S. PATENT DOCUMENTS

| | | |
|---|---|---|
| 2004/0228423 A1 | 11/2004 | Gueguen |
| 2009/0154599 A1* | 6/2009 | Siti et al. .................. 375/320 |
| 2010/0111160 A1* | 5/2010 | Siti .............................. 375/233 |
| 2011/0212743 A1* | 9/2011 | Yokomakura et al. ........ 455/509 |

FOREIGN PATENT DOCUMENTS

| | | |
|---|---|---|
| CN | 1674484 A | 9/2005 |
| CN | 101442390 A | 5/2007 |
| CN | 101378300 A | 3/2009 |
| CN | 101841375 A | 9/2010 |
| EP | 1 453 262 A1 | 2/2003 |
| WO | WO 2007/058218 A1 | 5/2007 |

OTHER PUBLICATIONS

PCT International Search Report issued in corresponding International Patent Application No. PCT/CN2010/079852 issued Dec. 16, 2010.

PCT Written Opinion of the International Searching Authority issued in corresponding International Patent Application No. PCT/CN2010/079852 issued Dec. 16, 2010.

Ait-Idir et al., "Space-Time Turbo Equalization with Successive Interference Cancellation for Frequency-Selective MIMO Channels", Sep. 2008, pp. 2766-2778.

* cited by examiner

DETECTION METHOD AND APPARATUS FOR MULTIPLE-INPUT MULTIPLE-OUTPUT SINGLE CARRIER BLOCK TRANSMISSION SYSTEM

CROSS-REFERENCE TO RELATED APPLICATIONS

This application is a continuation of International Application No. PCT/CN2010/079852, filed on Dec. 16, 2010, which claims priority to Chinese Patent Application No. 201010033682.8, filed on Jan. 8, 2010, both of which are hereby incorporated by reference in their entireties.

FIELD OF THE INVENTION

The present invention relates to the field of wireless communications, and in particular, to a detection method and apparatus in a multiple-input multiple-output single-carrier block transmission system.

BACKGROUND OF THE INVENTION

With people's increasing demands for wireless communications, and the rapid development of wireless multimedia services, in order to realize convergence of mobile communications and wideband wireless access, provide a higher data rate, and improve system performance, two main technologies, multiple-input multiple-output (Multiple-Input Multiple-Output, MIMO) and orthogonal frequency division multiplexing (Orthogonal Frequency Division Multiplexing, OFDM), are adopted in both the fourth generation mobile communication system (4G) and the long term evolution (Long Term Evolution, LTE) standards. Generally, the MIMO technology in which multiple antennas are used to perform wireless transmission may greatly increase system capacity and spectral efficiency without the need to add time frequency resources, and has a high value of application. The OFDM technology has advantages such as high spectrum utilization and anti-multipath fading, and is commonly regarded as a core technology for the 4G and LTE standards.

In the MIMO technology, multiple antennas are used to suppress channel fading and a data rate may be increased. With the increase of the number of antennas, a MIMO system not only multiplies in channel capacity, but also can provide a spatial diversity gain.

The OFDM is one type of multi-carrier modulation (MCM, Multi-Carrier Modulation) and its main idea is: dividing a channel into several orthogonal subchannels, converting a high-speed data signal into a parallel low-speed sub-data stream, which are modulated onto each subchannel for transmission. Orthogonal signals may be separated by adopting a related technology at a receiving end, so that mutual interference ICI among the subchannels may be reduced. A signal bandwidth on each subchannel is smaller than a related bandwidth of the channel, so that it may be regarded as flat fading on each subchannel, thereby eliminating inter-symbol interference. Moreover, because a bandwidth of each subchannel is only a small part of a bandwidth of an original channel, channel equalization becomes relatively easy. In the process of evolution to 3G/4G, the OFDM is one of the key technologies, which may combine technologies of diversity, space-time coding, interference and inter-channel interference suppression, and smart antenna, and improve the system performance to a maximum degree. The following types are included: V-OFDM, W-OFDM, F-OFDM, MIMO-OFDM, and multiband-OFDM.

In a wireless channel condition where time-varying multipath fading and interference noise coexist, an OFDM multi-carrier transmission technology has a strong anti-fading capability, is insensitive to narrowband interference and narrowband noise, has high spectral efficiency, and supports a variable user rate, and all these characteristics make it a mainstream access solution in the 4G mobile communication system and LTE standards. However, an OFDM system has the problem of a high peak-to-average ratio. To overcome an excessively high peak-to-average ratio of the OFDM and in consideration of the cost of a mobile terminal, a single carrier sending technology, namely, a technology based on the discrete fourier transform spread orthogonal frequency division multiplexing (DFT-Spread OFDM, DFT-S-OFDM), is formally adopted as a baseband modulation technology for an LTE uplink. In the DFT-S-OFDM technology, frequency domain spread processing of data is added on the basis of conventional OFDM transmission, so that peak-to-average ratio performance that is close to single carrier transmission is obtained, implementation is convenient, and flexible subcarrier allocation can be performed for different users, thereby meeting uplink requirements.

A receiver is an important component of a wireless communication system, a receiver with good performance is critical to the entire system, and a detection algorithm is the core of the receiver. However, due to characteristic of a technical system of a single carrier system, in its MIMO receiver, an algorithm that is similar to an MLD (maximum likelihood detection) algorithm commonly adopted in a MIMO-OFDM system cannot be adopted, while another MMSE-based parallel interference detection method that may be considered for use has disadvantages such as a long delay and low iterative interference cancellation efficiency, resulting in high implementation complexity and unsatisfying detection performance.

In an existing space division multiplexing MIMO-OFDM system, a commonly-used type of transceiver is V-BLAST, and a typical type of method for its MIMO detection is to perform QRD on a channel matrix to achieve the objective of partial stream separation. Next, a layer-by-layer IC method is adopted to cancel interference caused by another stream, and then sending stream detection is performed layer by layer through simple equalization processing. For the OFDM system, symbol modulation is in a frequency domain, therefore, serial interference cancellation equalization detection may be performed subcarrier by subcarrier. However, for the single carrier system, due to different signal sending models and characteristics that equalization processing is in the frequency domain while detection of a modulation symbol needs to be in a time domain, currently there is no detection method with high performance and low complexity.

SUMMARY OF THE INVENTION

An aspect of the present invention discloses a detection method, a receiver, and an apparatus in a multiple-input multiple-output single-carrier block transmission system, which have advantages of high performance and low complexity.

An aspect of the present invention discloses a detection method in a multiple-input multiple-output single-carrier block transmission system, where the method includes:

performing fast Fourier transform on a received signal, and after transforming the received signal to a frequency domain, performing subcarrier demapping;

performing MMSE-SQRD decomposition on an equivalent channel matrix of the frequency domain, obtaining a preprocessing matrix and a block upper triangular matrix, and performing preprocessing on a frequency domain received signal by using the preprocessing matrix;

reconstructing a priori information of a fed back sent symbol by using a mean and a variance, performing, layer by layer, soft interference cancellation equalization which is based on a minimum mean squared error on a sent symbol block which is on each stream;

performing inverse fast Fourier transform on a frequency domain equalized symbol to a time domain, reconstructing an a posteriori mean of the sent symbol and an a posteriori variance of the sent symbol, transforming them to the frequency domain, using them as a priori information to continue performing soft interference cancellation equalization on another stream or subsequent iteration;

after finishing iterative interference cancellation equalization, calculating a log-likelihood ratio of a bit of the sent symbol; and sending the log-likelihood ratio of the bit of the sent symbol to a channel decoder for channel decoding.

Another aspect of the present invention further discloses a receiver, including: an FFT unit, a subcarrier demapping unit, a channel estimation unit, a detection unit, and a channel decoder.

The FFT unit is configured to perform fast Fourier transform on a received signal.

The subcarrier demapping unit is configured to perform subcarrier demapping on a transformed frequency domain signal.

The channel estimation unit is configured to perform channel estimation and noise power estimation on a pilot portion in the received signal, and send an estimated signal together with the frequency domain received signal to the detection unit.

The detection unit is configured to perform MMSE-SQRD decomposition on an equivalent channel matrix of a frequency domain, obtain a preprocessing matrix and a block upper triangular matrix, perform processing on the frequency domain received signal by using the preprocessing matrix; reconstruct a priori information of a fed back sent symbol by using a mean and a variance, and perform, layer by layer, soft interference cancellation equalization which is based on a minimum mean squared error on a sent symbol block which is on each stream; perform inverse fast Fourier transform on a frequency domain equalized symbol to a time domain, reconstruct an a posteriori mean of the sent symbol and an a posteriori variance of the sent symbol, transform them to the frequency domain, and use them as a priori information to continue performing soft interference cancellation equalization on another stream or subsequent iteration; after iterative interference cancellation equalization is finished, calculate a log-likelihood ratio of a bit of the sent symbol; and send the log-likelihood ratio of the bit of the sent symbol to the channel decoder for channel decoding.

Another aspect of the present invention further discloses a detection apparatus, including:

a decomposition processing unit, configured to perform MMSE-SQRD decomposition on an equivalent channel matrix of a frequency domain, obtain a preprocessing matrix and a block upper triangular matrix, and perform processing on a frequency domain received signal by using the preprocessing matrix;

a cancellation equalization unit, configured to reconstruct a priori information of a fed back sent symbol by using a mean and a variance, and perform, layer by layer, soft interference cancellation equalization which is based on a minimum mean squared error on a sent symbol block which is on each stream;

a transform unit, configured to perform inverse fast Fourier transform on a frequency domain equalized symbol to a time domain;

a reconstruction unit, configured to reconstruct an a posteriori mean of the sent symbol and an a posteriori variance of the sent symbol, and transform them to the frequency domain, and use them as a priori information to continue performing soft interference cancellation equalization on another stream or subsequent iteration;

a calculation unit, configured to, after iterative interference cancellation equalization is finished, calculate a log-likelihood ratio of a bit of the sent symbol; and a sending unit, configured to send the log-likelihood ratio of the bit of the sent symbol to a channel decoder for channel decoding.

The foregoing detection method, receiver and system in the multiple-input multiple-output single-carrier block transmission system have the advantages of high performance and low complexity.

BRIEF DESCRIPTION OF THE DRAWINGS

To illustrate the technical solutions according to the embodiments of the present invention more clearly, accompanying drawings required for describing the embodiments are introduced briefly in the following. Apparently, the accompanying drawings in the following description are only some embodiments of the present invention, and persons of ordinary skill in the art may further obtain other drawings according to the accompanying drawings without creative efforts.

DETAILED DESCRIPTION OF THE EMBODIMENTS

In the following description, for the purpose of illustration rather than limitation, specific details such as specific system structures, interfaces, and technologies are mentioned for thorough understanding of the present invention. However, persons skilled in the art should understand that, the present invention may also be implemented in another embodiment without these specific details. In other cases, detailed illustration of well-known apparatus, circuits and methods are omitted to prevent unnecessary details from affecting description of the present invention.

The technical solutions of the present invention may be applicable to various communication systems, for example, GSM, code division multiple access (CDMA, Code Division Multiple Access) system, wideband code division multiple access (WCDMA, Wideband Code Division Multiple Access Wireless), general packet radio service (GPRS, General Packet Radio Service), and long term evolution (LTE, Long Term Evolution). A mobile terminal (Mobile Terminal) may also be referred to as a mobile user (UE, User Equipment) and a mobile user equipment, and may communicate with one or multiple core networks via a radio access network (for example, a RAN, Radio Access Network). The mobile terminal may be a mobile station, for example, a mobile phone (or referred to as a "cellular" phone) and a computer having a mobile terminal, for example, may be a mobile apparatus that is portable, pocket-sized, handheld, built in a computer or mounted on a vehicle, and they exchange language and/or data with the radio access network.

The present invention proposes an iterative soft interference cancellation detection method of sorted QR decomposition (Sorted QR Decomposition, SQRD) based on a minimum mean squared error (Minimum Mean Squared Error, MMSE) criterion and its receiver, which are applicable to a single carrier MIMO system, and have advantages of high performance and low complexity.

Work principles of the detection method and its receiver disclosed in the present invention are illustrated in detail in the following with reference to the accompanying drawings.

Figure 1:
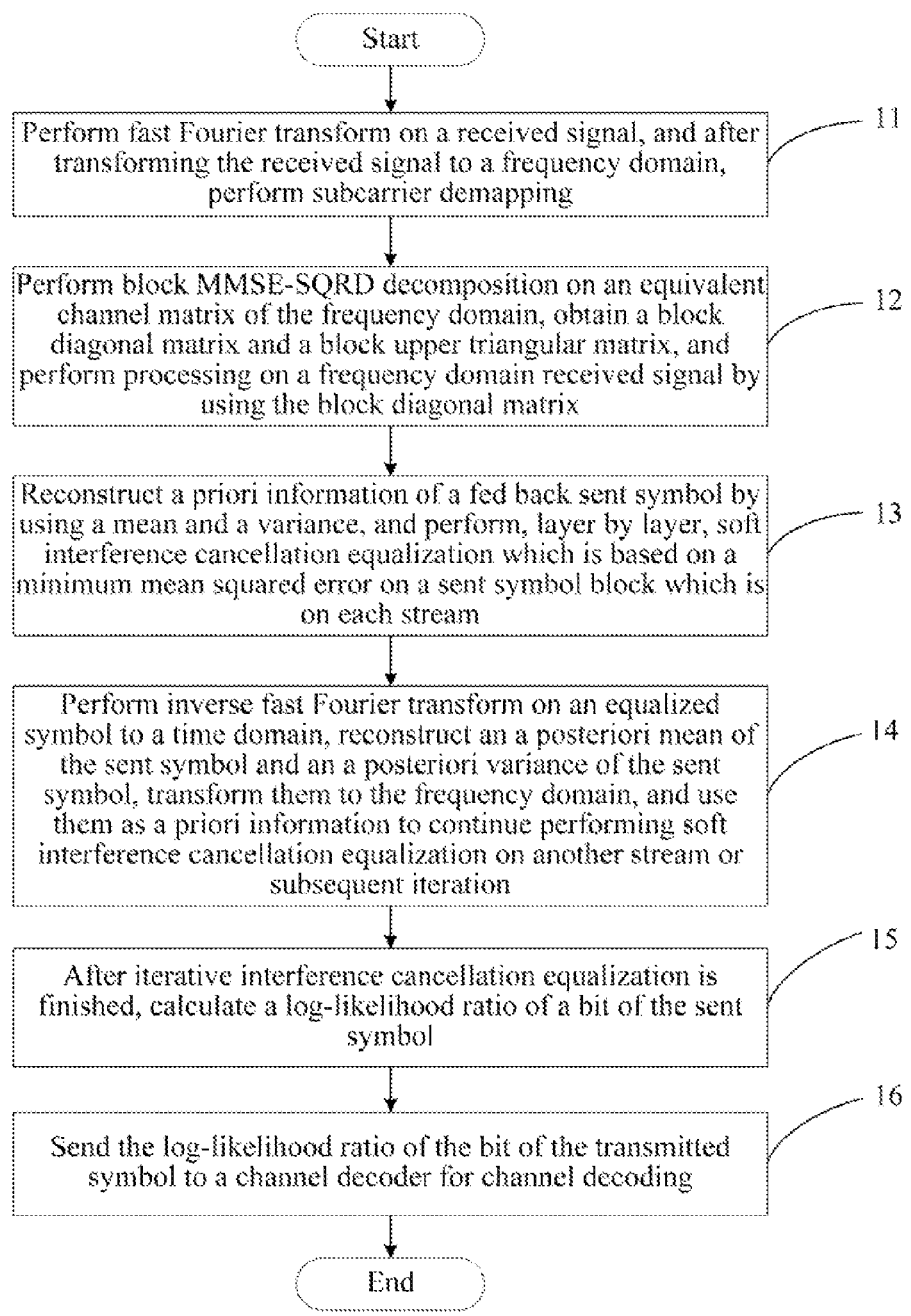
FIG. 1 is a schematic flow chart of a detection method in a communication system according to an embodiment of the present invention.

An aspect of the present invention discloses a detection method of MMSE-SQRD-based serial soft interference cancellation iteration, where the method is applicable to a single carrier block transmission MIMO system. FIG. 1 is a schematic flow chart of a detection method in a communication system according to an embodiment of the present invention, namely, a detection method in a multiple-input multiple-output single-carrier block transmission system, where the method is mainly as follows.

11: Perform fast Fourier transform (Fast Fourier Transform, FFT) on a received signal, and after transforming the received signal to a frequency domain, perform subcarrier demapping.

12: Perform MMSE-SQRD decomposition on an equivalent channel matrix of the frequency domain, obtain a preprocessing matrix and a block upper triangular matrix, and perform preprocessing on a frequency domain received signal by using the preprocessing matrix.

13: Reconstruct a priori information of a fed back sent symbol by using a mean and a variance, and perform, layer by layer, soft interference cancellation equalization which is based on a minimum mean squared error on a sent symbol block which is on each stream.

14: Perform inverse fast Fourier transform (Inverse Fast Fourier Transform, IFFT) on a frequency domain equalized symbol to a time domain, reconstruct an a posteriori mean of the sent symbol and an a posteriori variance of the sent symbol, transform them to the frequency domain, and use them as a priori information to continue performing soft interference cancellation equalization on another stream or subsequent iteration.

15: After finishing iterative interference cancellation equalization, calculate a log-likelihood ratio (Log-Likelihood ratio, LLR) of a bit of the sent symbol.

16: Send the log-likelihood ratio of the bit of the sent symbol to a channel decoder for channel decoding.

It may be known from the foregoing description that, through sorted QR decomposition, a matrix inverse operation in minimum mean squared error equalization is avoided, so complexity is significantly reduced. In addition, through layer-by-layer soft interference cancellation detection after SQRD decomposition, inter-stream interference suppression may be performed in first iteration. Compared with a conventional algorithm of parallel iterative soft interference cancellation detection, when the numbers of times of iteration are the same, especially under the limit that practically a receiver can only support a small number of times of iteration, the inter-stream interference suppression has more evident advantages, thereby ensuring higher cost performance.

Meanings of symbols appearing in the following are first illustrated.

$n_T$ and $n_R$ respectively represent the number of transmitting antennas and the number of receiving antennas, M represents the length of a single carrier symbol block, and $x_{n,m}$, $\hat{x}_{n,m}$ and $\bar{x}_{n,m}$ respectively represent an $m^{th}$ time domain sent symbol within a current single carrier symbol block of an $n^{th}$ data stream, its estimated value after equalization, and a reconstructed symbol mean; x, $\hat{x}$ and $\bar{x}$ respectively represent a symbol vector corresponding to current single carrier symbol blocks of all streams, its estimated value after equalization, and a reconstructed symbol mean, that is, $x_n = [x_{n,1}, x_{n,2}, \ldots, x_{n,m}]^T$, and the rest can be deduced by analogy; a sent symbol x plus a superscript, $x^{(f)}$, represents a corresponding frequency domain symbol, and the rest can be deduced by analogy; $v_{n,m}$ and $\bar{v}_n$ respectively represent an $m^{th}$ time domain symbol variance within the current single carrier symbol block of the $n^{th}$ data stream and a frequency domain symbol variance obtained by averaging all $v_{n,m}$ within the current single carrier symbol block of the $n^{th}$ data stream, $\bar{V}$ is a frequency domain symbol variance matrix of all streams, and is formed of all $\bar{v}_n$; $\Lambda$ represents an equivalent frequency domain channel response, $\Lambda_k$ represents a frequency domain channel response at a $k^{th}$ frequency, $y^{(f)}$ represents a frequency domain received signal, $y_k^{(f)}$ represents a frequency domain received signal at a $k^{th}$ subcarrier, $\sigma_n^2$ represents a noise variance, $\rho_{n,k}$ represents a time domain equivalent signal amplitude output by an equalizer, $\sigma_{x_n}^2$ represents normalized residual interference and a noise variance of an equalized output time domain symbol of the $n^{th}$ data stream; F represents a normalized fast Fourier transform matrix, $I^m$ represents a unit matrix at a level m×m, $\otimes$ represents Kroneker multiplication, $e_k$ represents a unit vector with a $k^{th}$ element being 1 and other elements being 0; $[J]_{m,n}$ indicates that an element is taken from an $m^{th}$ row and an $n^{th}$ column of a matrix J, $J^H$ represents a conjugate transpose matrix of the matrix J, $J^T$ represents a transpose matrix of the matrix J, a* indicates that a conjugate of a complex number a is taken, |a| represents a modulus value of the complex number a. For simplicity of description, an $n^{th}$ stream is used in the following to represent an $n^{th}$ transmitted data stream.

Figure 2A:
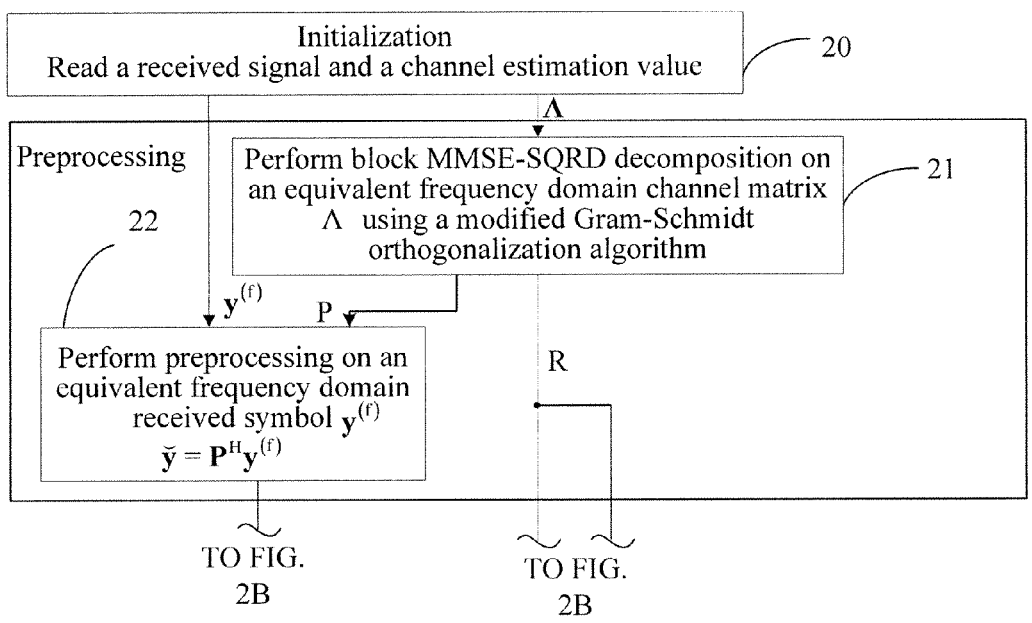
FIG. 2 is a schematic flow chart of a detection method in a communication system according to another embodiment of the present invention.
Figure 2B:
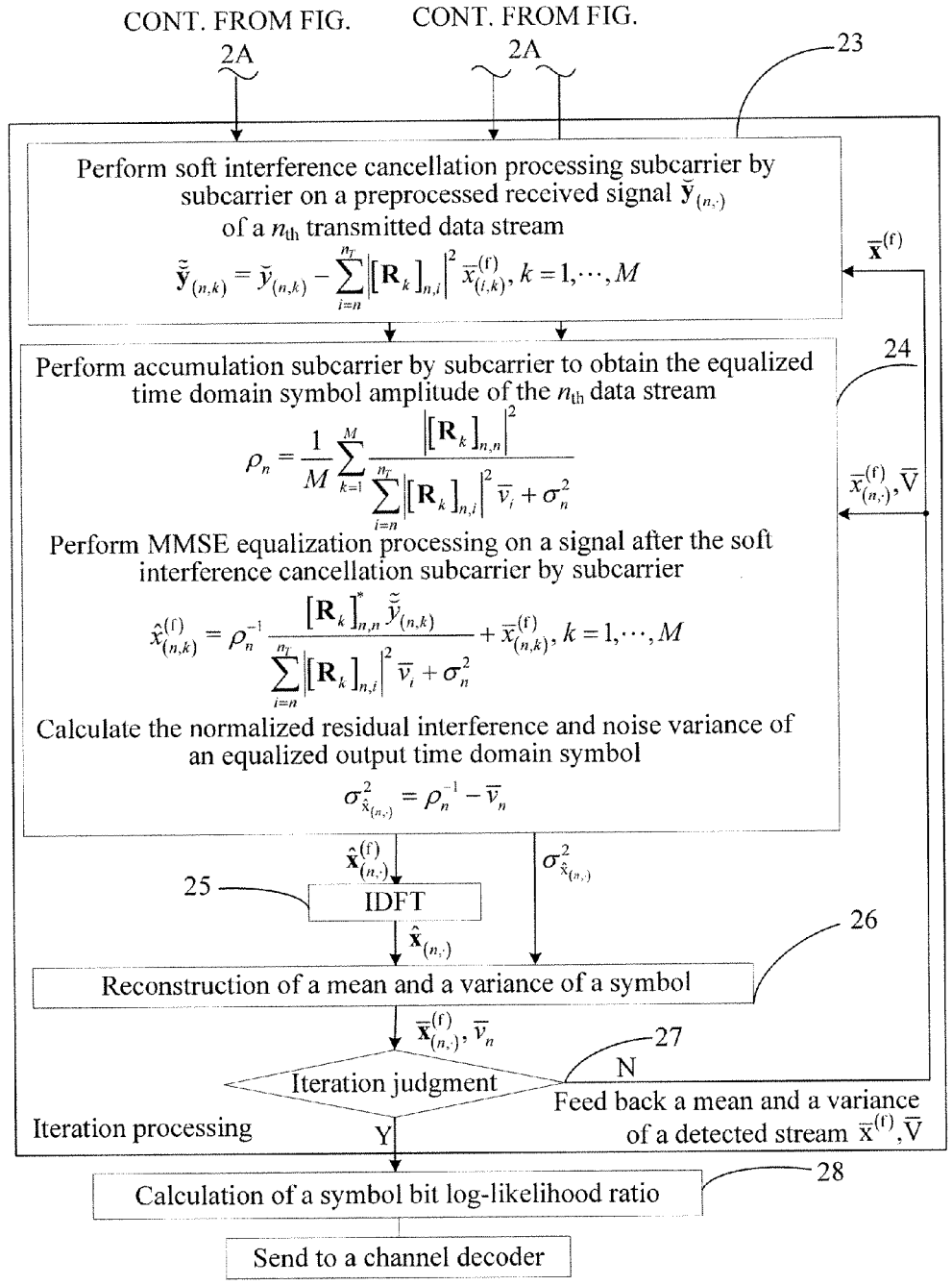

FIG. 2 is a schematic flow chart of a detection method in a communication system according to another embodiment of the present invention, where the method is mainly as follows.

Initialization:

20: Load a signal and a parameter.

Load a frequency domain received signal $y^{(f)}$, an estimated frequency domain channel matrix $\Lambda$ and noise power $\sigma_n^2$; the maximum number of times of iteration within a detector is MaxIterNum; and set $\bar{x}_{n,k}^{(f)} = 0$, $\bar{v}_n = 1$, n=1, ..., $N_T$, k=1, ..., M.

Preprocessing:

21: Perform block MMSE-SQRD decomposition on an equivalent frequency domain channel matrix by using a modified Gram-Schmidt orthogonalization algorithm.

Perform MMSE-SQRD decomposition on an equivalent channel matrix $$\Delta_k = \begin{bmatrix} \Lambda_k \\ \sigma_n I_{n_T} \end{bmatrix}, k=1,\ldots,M$$

subcarrier by subcarrier to obtain: a column orthogonal matrix $\underline{U}_k$, an upper triangular matrix $R_k$, and further divide $\underline{U}_k$ into: $P_k$ and an upper triangular matrix $T_k$, which is represented as a formula $$\Delta_k = \underline{U}_k R_k = \begin{bmatrix} P_k \\ T_k \end{bmatrix} R_k.$$

M represents the length of the single carrier symbol block, that is, the number of subcarriers, k represents a subcarrier serial number, $\sigma_n$ represents noise power in a received signal, and it is usually assumed that the noise power is the same on each receiving antenna, $I_{n_T}$ represents a unit matrix with the size of $n_T \times n_T$, $\Lambda_k$ is a channel matrix on a $k^{th}$ subcarrier, $n_T$ and $n_R$ respectively represent the number of transmitting antennas and the number of receiving antennas, and M represents the length of the single carrier symbol block.

Through simple matrix division and extraction and combination, a block diagonal matrix $$P = \begin{bmatrix} P_1 & & & \\ & P_2 & & \\ & & \ddots & \\ & & & P_M \end{bmatrix}$$

and a preprocessed equivalent channel response matrix $$R_{n,i} = \begin{bmatrix} [R_1]_{n,i} & & \\ & \ddots & \\ & & [R_M]_{n,i} \end{bmatrix}, n=1,\ldots,N_T, i=n,\ldots,N_T$$

that corresponds to each sent symbol stream may be obtained, and based on characteristics of the block diagonal matrix, only non-zero portions in the matrices P and $R_{n,i}$ need to be kept and saved.

22: Perform preprocessing on the frequency domain received signal subcarrier by subcarrier by using the obtained preprocessing matrix, for example, as shown in formula (1).

$$\check{y}_k = P_k^H y_k^{(f)}, k=1,\ldots,M \quad (1.)$$

M represents the length of the single carrier symbol block, that is, the number of subcarriers, k represents the subcarrier serial number, $y_k^{(f)}$ represents a frequency domain received signal on a $k^{th}$ subcarrier, $P_k$ is a preprocessing matrix which is on the $k^{th}$ subcarrier and obtained through the MMSE-SQRD, $\check{y}_k$ is a received signal after preprocessing on the $k^{th}$ subcarrier.

Iterative Processing

Make the number of times of iteration i=1.

Iteration jump point 1: Set a serial number of a sent symbol stream to be detected $n=n_T$.

23: Perform soft interference cancellation subcarrier by subcarrier on a preprocessed received signal corresponding to an $n^{th}$ transmitted data stream, for example, as shown in formula (2).

$$\tilde{y} = \check{y}_{n,k} - \sum_{i=n}^{n_T} [R_k]_{n,i} \bar{x}_{i,k}^{(f)}, k=1,\ldots,M \quad (2.)$$

M represents the length of the single carrier symbol block, k represents the subcarrier serial number, $\check{y}_k$ represents a received signal on a $k^{th}$ subcarrier corresponding to an $n^{th}$ stream, $[R_k]_{n,n}$ is an equivalent channel coefficient of a preprocessed $n^{th}$ stream, $[R_k]_{n,i}$, i≠n, is an interference coefficient of a preprocessed $i^{th}$ stream on the $n^{th}$ stream, $\bar{x}_{i,k}^{(f)}$ is an a posteriori mean which is of a $k^{th}$ subcarrier symbol and obtained by reconstructing an $i^{th}$ stream mean and transforming it to a frequency domain, and $\tilde{y}_{n,k}$ is a received signal on the $k^{th}$ subcarrier corresponding to the $n^{th}$ stream after the soft interference cancellation.

24: Perform frequency domain equalization processing on a current single carrier symbol of the $n^{th}$ transmitted data stream.

A time domain symbol amplitude is obtained through accumulating and equalizing subcarrier by subcarrier, for example, as shown in formula (3).

$$\rho_n = \frac{1}{M} \sum_{k=1}^{M} \frac{|[R_k]_{n,n}|^2}{\sum_{i=n}^{n_T} |[R_k]_{n,i}|^2 \bar{v}_i + \sigma_n^2} \quad (3.)$$

M represents the length of the single carrier symbol block, $n_T$ represents the number of transmitting antennas, $[R_k]_{n,n}$ is the equivalent channel coefficient of the preprocessed $n^{th}$ stream, $[R_k]_{n,i}$, i≠n, is the interference coefficient of the preprocessed $i^{th}$ stream on the $n^{th}$ stream, $\bar{v}_i$ is an a posteriori variance which is of a frequency domain symbol of an $i^{th}$ stream and obtained through reconstruction, $\sigma_n^2$ is the noise power, $\rho_n$ is a time domain symbol amplitude after the current single carrier symbol of the $n^{th}$ stream is equalized.

Perform, subcarrier by subcarrier, MMSE equalization processing on a signal after soft interference cancellation, for example, as shown in formula (4).

$$\hat{x}_{(n,k)}^{(f)} = \rho_n^{-1} \frac{[R_k]_{n,n}^* \tilde{y}}{\sum_{i=n}^{n_T} |[R_k]_{n,i}|^2 \bar{v}_i \sigma_n^2} + \bar{x}_{(n,k)}^{(f)}, k=1,\ldots,M \quad (4.)$$

M represents the length of the single carrier symbol block, k represents the subcarrier serial number, $n_T$ represents the number of transmitting antennas, $[R_k]_{n,n}$ is the equivalent channel coefficient of the preprocessed $n^{th}$ stream, $[R_k]_{n,i}$, i≠n, is the interference coefficient of the preprocessed $i^{th}$ stream on the $n^{th}$ stream, $\bar{v}_i$ is the a posteriori variance which is of the frequency domain symbol of the $i^{th}$ stream and obtained through reconstruction, $\sigma_n^2$ is the noise power, $\tilde{y}_{n,k}$ is a signal after soft interference cancellation is performed subcarrier by subcarrier on the preprocessed received signal corresponding to the $n^{th}$ transmitted data stream, $\bar{x}_{n,k}^{(f)}$ is an a posteriori mean which is of a $k^{th}$ subcarrier symbol and obtained by reconstructing an $n^{th}$ transmitted data stream mean and transforming it to the frequency domain, $\rho_n^{-1}$ is a reciprocal of the time domain symbol amplitude after the current single carrier symbol of the $n^{th}$ stream is equalized.

Calculate normalized residual interference and a noise variance of an equalized output time domain symbol, for example, as shown in formula (5).

$$\sigma_{\hat{x}_n}^2 = \rho_n^{-1} - \bar{v}_n \qquad (5.)$$

$\bar{v}_n$ is the a posteriori variance which is of the frequency domain symbol of the $i^{th}$ stream and obtained through reconstruction, $\sigma_{\hat{x}_n}^2$ is the normalized residual interference and noise variance after the current single carrier symbol of the $n^{th}$ stream is equalized.

25: Perform inverse discrete Fourier transform (IDFT, Inverse Discrete Fourier Transform) on a frequency domain equalized symbol to a time domain.

Perform IDFT transform on a frequency domain equalized symbol vector $\bar{x}_{n,k}^{(f)}$ of the current single carrier symbol of the $n^{th}$ transmitted data stream to obtain a time domain symbol after equalization $\bar{x}_{n,k}$.

26: Reconstruct a mean of a symbol and a variance of the symbol.

Reconstruct a time domain symbol mean $\bar{x}_n$ and variance $\{v_{n,m}\}_{m=1}^M$ that are of an $n^{th}$ transmitted symbol stream through $\hat{x}_n$ and $\sigma_{\hat{x}_n}^2$, and perform DFT on $\bar{x}_n$ to obtain an updated frequency domain symbol mean $\bar{x}_n^{(f)}$ required in the soft interference cancellation equalization, and average a time domain symbol variance to obtain an updated frequency domain symbol variance $$\bar{v}_n = \frac{1}{M}\sum_{m=1}^{M} v_{n,m}.$$

27: Judge stopping of iteration.

Set $n=n-1$, if $n<1$, jump to "iteration jump point 2"; otherwise, jump to 23.

Iteration jump point 2: Set $i=i+1$, for example, $i \le \text{MaxIterNum}$, jump to "iteration jump point 1"; otherwise, detection of the current single carrier is finished, and jump to 28.

28: Calculate a symbol bit log-likelihood ratio.

According to equalized symbols of all streams of the current single carrier symbol, calculate a symbol bit LLR and output it.

Figure 3:
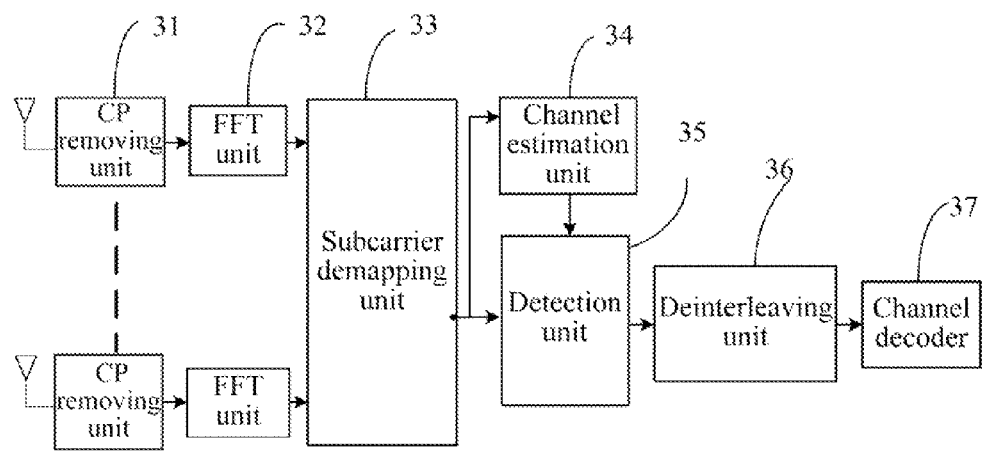
FIG. 3 is a schematic structural diagram of a receiver according to another embodiment of the present invention.

Another embodiment of the present invention further discloses an instance of a receiver based on the foregoing MIMO iterative detection method of the single carrier block transmission system. FIG. 3 is a schematic structural diagram of a receiver according to another embodiment of the present invention.

As shown in FIG. 3, the receiver includes: a CP removing unit 31, an FFT unit 32, a subcarrier demapping unit 33, a channel estimation unit 34, a detection unit 35, a deinterleaving unit 36 and a channel decoder 37.

The receiver performs, according to a symbol synchronization amount and in the CP removing unit 31, CP removal processing on received signals which are on multiple receiving antennas, sends processed received signals to the FFT unit 32 for fast Fourier transform performed on the received signals, and after the received signals are transformed to a frequency domain, the subcarrier demapping unit 33 further finishes user demapping to obtain a multi-stream received signal (that is, frequency domain received signal) that is on a target bandwidth. This process is usually referred to as a preprocessing portion. Based on a pilot portion in the received signal, the channel estimation unit 34 performs channel estimation and noise power estimation, and sends an estimated signal together with the frequency domain received signal to the detection unit 35. The detection unit 35, based on MMSE-SQRD serial soft interference cancellation iteration, performs detection, for example, accomplishes detection of each sending data stream by adopting the iterative soft interference cancellation detection method disclosed in the foregoing method embodiment, and sends a symbol bit soft value of each stream to the subsequent deinterleaving unit 36 and channel decoder 37 for accomplishing error correction and decoding of sent information.

For example, the detection unit 35 performs MMSE-SQRD decomposition on an equivalent channel matrix of the frequency domain to obtain a preprocessing matrix and a block upper triangular matrix, and performs preprocessing on the frequency domain received signal by using the preprocessing matrix; reconstructs a priori information of a fed back sent symbol by using a mean and a variance, and performs, layer by layer, soft interference cancellation equalization which is based on a minimum mean squared error on a sent symbol block which is on each stream; performs inverse fast Fourier transform on a frequency domain equalized symbol to a time domain, reconstructs an a posteriori mean of the sent symbol and an a posteriori variance of the sent symbol and transforms them to the frequency domain, uses them as a priori information to continue performing soft interference cancellation equalization on another stream or subsequent iteration; after iterative interference cancellation equalization is finished, calculates a log-likelihood ratio of a bit of the sent symbol; and sends the log-likelihood ratio of the bit of the sent symbol to a channel decoder for channel decoding.

The detection unit 35 is further configured to perform MMSE-SQRD decomposition on an equivalent frequency domain channel matrix by using a modified Gram-Schmidt orthogonalization algorithm, and perform preprocessing on the frequency domain received signal subcarrier by subcarrier by using the preprocessing matrix obtained through decomposition.

The detection unit 35 is further configured to perform soft interference cancellation subcarrier by subcarrier on a preprocessed received signal corresponding to an $n^{th}$ transmitted data stream; and perform frequency domain equalization processing on a current single carrier symbol of the $n^{th}$ transmitted data stream.

The detection unit 35 is further configured to perform accumulating and equalizing subcarrier by subcarrier to obtain a time domain symbol amplitude; perform, subcarrier by subcarrier, MMSE equalization processing on a signal after the soft interference cancellation; and calculate normalized residual interference and a noise variance of an equalized output time domain symbol.

Figure 4:
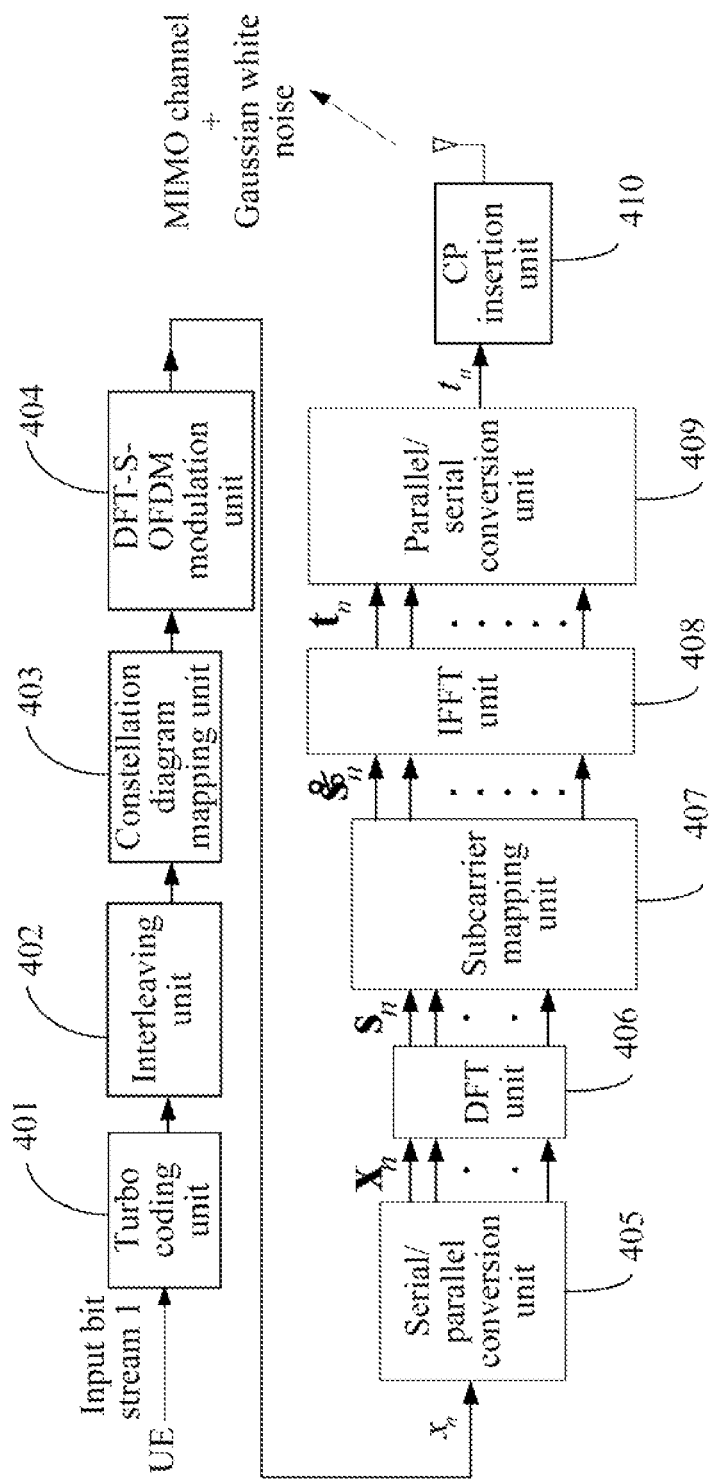
FIG. 4 is a schematic structural diagram of a sending apparatus according to another embodiment of the present invention.

For example, it is assumed that a sending apparatus, for example, a transmitter has $n^T$ transmitting antennas, and a receiver has $n^R$ receiving antennas. FIG. 4 is a schematic structural diagram of a sending apparatus according to another embodiment of the present invention, where the apparatus includes a Turbo coding unit 401, an interleaving unit 402, a constellation diagram mapping unit 403, a DFT-S-OFDM modulation unit 404, a serial/parallel conversion unit 405, a DFT unit 406, a subcarrier mapping unit 407, an IFFT unit 408, a parallel/serial conversion unit 409, and a CP insertion unit 410. A work process of a transceiver apparatus that sends a signal is described as follows.

The sending apparatus receives multiple input bit streams of multiple terminal devices (User Equipment, UE) or one UE. For convenience of description, an example that one UE inputs bit streams is taken for illustration.

The Turbo coding unit 401 performs error correction and coding (a Turbo code or an LDPC code) on information bits of the UE. After coding, the information bits are input to the interleaving unit 402 for interleaving. After interleaving, the information bits are input to the constellation diagram mapping unit 403 for constellation diagram mapping, and then input to the DFT-S-OFDM modulation unit 404.

After the modulation, the information bits are input to the serial/parallel conversion unit 405 for serial-parallel conversion. A data stream of each transmitting antenna is divided into symbol blocks with a length being M. The DFT unit 406 performs normalized DFT transform of a point M on the symbol blocks. The subcarrier mapping unit 407 then uses a centralized mapping matrix Q to map an M-dimension vector to an N-dimension vector for subcarrier mapping. Next, the IFFT unit 408 performs IFFT transform of a point N, and after the transform, the parallel/serial conversion unit 407 performs parallel/serial conversion. Finally, the CP insertion unit 410 inserts a cyclic prefix (CP), and then each transmitting antenna performs sending independently.

Exponentiation of 2 is generally performed for the length M of a data block. The length of the cyclic prefix is greater than a multi-path delay of a channel normalized maximum. After the cyclic prefix is removed, a relationship between a received signal and a sent signal may be as shown in formula (6).

$$y = H((F_N^H Q F_M) \otimes I_{n_T}) x + n \quad (6.)$$

where $x=[x_{1,1}, \ldots, x_{n_T,1}, \ldots, x_{1,M}, \ldots, x_{n_T,M}]^T$, $y=[y_{1,1}, \ldots, y_{n_R,1}, \ldots, y_{1,N}, \ldots, y_{n_R,M}]^T$, $y_{n,k}$ represents a $k^{th}$ received symbol on an $n^{th}$ receiving antenna, n is complex Gaussian noise, and a noise variance is $\sigma_n^2$. H is a block cyclic matrix and may be diagonalized by a Fourier transform matrix $F_N$, that is, as shown in formula (7).

$$H = (F_N^H \otimes I_{n_R}) \Omega (F_N \otimes I_{n_T}) \quad (7.)$$

where $\Omega$ is a block diagonal matrix, that is, as shown in formula (8).

$$\Omega = \begin{bmatrix} \Omega_1 & & & \\ & \Omega_2 & & \\ & & \ddots & \\ & & & \Omega_N \end{bmatrix} \quad (8.)$$

where $\Omega_k \in C^{n_R \times n_T}$ represents a frequency domain channel response matrix at a $k^{th}$ subcarrier frequency between the transmitting antenna and the receiving antenna, and may be obtained through channel estimation. What may be obtained from formula (6) is as shown in formula (9).

$$y = (F_N^H \otimes I_{n_R}) \Omega (F_N \otimes I_{n_T})(F_N^H \otimes I_{n_T}) \quad (9.)$$
$$(Q \otimes I_{n_T})(F_M \otimes I_{n_T}) x + n$$
$$= (F_N^H \otimes I_{n_R}) \Omega (Q \otimes I_{n_T})(F_M \otimes I_{n_T}) x + n$$

where FFT of a point N is performed on a received signal y, and after a time domain signal is transformed to a frequency domain channel, perform subcarrier demapping to obtain formula (10) as follows.

$$y^{(f)} = (Q^H \otimes I_{n_R})(F_N \otimes I_{n_R}) y \quad (10.)$$
$$= (Q^H \otimes I_{n_R}) \Omega (Q \otimes I_{n_T})(F_M \otimes I_{n_T}) x +$$
$$(Q^H \otimes I_{n_R})(F_N \otimes I_{n_R}) n$$
$$= \Lambda (F_M \otimes I_{n_T}) x + n^{(f)}$$

where $\Lambda = (Q^H \otimes I_{n_R}) \Omega (Q \otimes I_{n_T})$, $\Lambda$ is a block diagonal matrix of $Mn_R \times Mn_T$, a submatrix $\Lambda_t \in C^{n_R \times n_T}$, that is:

$$\Lambda = \begin{bmatrix} \Lambda_1 & & & \\ & \Lambda_2 & & \\ & & \ddots & \\ & & & \Lambda_M \end{bmatrix},$$

$n^{(f)} = (Q^H \otimes I_{n_R})(F_N \otimes I_{n_R}) n$ is frequency domain equivalent noise, and still conforms to complex Gaussian distribution, a mean is 0, and a variance is $\sigma_n^2$.

Perform block MMSE-SQRD decomposition on $\Lambda$, which is equivalent to performing SQRD decomposition on an equivalent channel matrix $\underline{\Lambda}_k$ on each subcarrier, as shown in formula (11).

$$\underline{\Lambda}_k = \begin{bmatrix} \Lambda_k \\ \sigma_n I_{n_T} \end{bmatrix} = \underline{U}_k R_k = \begin{bmatrix} P_k \\ T_k \end{bmatrix} R_k, k = 1, \ldots, M \quad (11.)$$

$\underline{U}_k$ is a column orthogonal matrix at a level $(n_R+n_T) \times n_T$, $R_k$ is an upper triangular matrix at a level $n_R \times n_T$, $\underline{U}_k$ is divided into: a matrix $P_k$ at a level $n_R \times n_T$, (also referred to as a preprocessing matrix) and an upper triangular matrix $T_k$ at a level $n_R \times n_T$.

DEFINITION $$P = \begin{bmatrix} P_1 & & & \\ & P_2 & & \\ & & \ddots & \\ & & & P_M \end{bmatrix},$$

$$T = \begin{bmatrix} T_1 & & & \\ & T_2 & & \\ & & \ddots & \\ & & & T_M \end{bmatrix} \text{ and}$$

$$R = \begin{bmatrix} R_1 & & & \\ & R_2 & & \\ & & \ddots & \\ & & & R_M \end{bmatrix}$$

Perform left multiplication processing on a frequency domain received signal $y^{(f)}$ by using $P^H$ after subcarrier demapping for preprocessing, to obtain formula (12a) as follows.

$$\breve{y} = P^H y^{(f)} = P^H (\Lambda (F_M \otimes I_{n_T})x + n^{(f)}) \quad (12.a)$$
$$= R(F_M \otimes I_{n_T})x + P^H n^{(f)} - \sigma_n T^H (F_M \otimes I_{n_T})x$$

The processing is completely equivalent to the preprocessing subcarrier by subcarrier as shown in (12b).

$$\breve{y}_k = P_k^H y_k^{(f)}, k=1, \ldots, M \quad (12b)$$

According to characteristics of a block upper triangular matrix R, a random transmitted data stream n in formula (12a) is extracted from a signal at each frequency at a receiving end to write into a matrix-vector form, as shown in formula (13).

$$\begin{pmatrix} \breve{y}_{n,1} \\ \vdots \\ \breve{y}_{n,M} \end{pmatrix} = \begin{bmatrix} [R_1]_{n,n} & & \\ & \ddots & \\ & & [R_M]_{n,n} \end{bmatrix} F_M \begin{pmatrix} x_{n,1} \\ \vdots \\ x_{n,M} \end{pmatrix} + \quad (13.)$$

$$\sum_{i=n+1}^{n_T} \begin{bmatrix} [R_1]_{n,i} & & \\ & \ddots & \\ & & [R_M]_{n,i} \end{bmatrix} F_M \begin{pmatrix} x_{i,1} \\ \vdots \\ x_{i,M} \end{pmatrix} +$$

$$\sum_{j=1}^{n_R} \begin{bmatrix} [P_1^H]_{n,j} & & \\ & \ddots & \\ & & [P_M^H]_{n,j} \end{bmatrix} \begin{pmatrix} n_{j,1}^{(f)} \\ \vdots \\ n_{j,M}^{(f)} \end{pmatrix} -$$

$$\sigma_n \sum_{i=1}^{n} \begin{bmatrix} [T_1^H]_{n,i} & & \\ & \ddots & \\ & & [T_M^H]_{n,i} \end{bmatrix} F_M \begin{pmatrix} x_{i,1} \\ \vdots \\ x_{i,M} \end{pmatrix}$$

$n_{j,k}^{(f)}$ represents noise in a received signal on a $k^{th}$ subcarrier on a $j^{th}$ receiving antenna, and at the same time, set a noise vector in a frequency domain received signal of the $j^{th}$ receiving antenna as $n_j^{(f)}$. The vector $(\breve{y}_{n,1}, \ldots, \breve{y}_{n,M})$ is also represented as $\breve{y}_n$ in the following, and on the rest can be deduced by analogy.

For convenience of illustration, it is defined as follows.

$$R_{n,i} = \begin{bmatrix} [R_1]_{n,i} & & \\ & \ddots & \\ & & [R_M]_{n,i} \end{bmatrix},$$

$$K_{n,i} = \begin{bmatrix} [P_1^H]_{n,i} & & \\ & \ddots & \\ & & [P_M^H]_{n,i} \end{bmatrix} \text{ and }$$

$$A_{n,i} = \begin{bmatrix} [T_1^H]_{n,i} & & \\ & \ddots & \\ & & [T_M^H]_{n,i} \end{bmatrix}$$

From formula (13), after an a priori symbol mean of n transmitted data streams and an interference item produced by $n+1 \sim N_T$ transmitted data streams are canceled, formula (14a) as follows may be obtained.

$$\breve{y}_n = \breve{y}_n - \sum_{i=n}^{n_T} R_{n,i} \bar{x}_i^{(f)} \quad (14.a)$$

-continued $$= R_{n,n} F_M x_n + \sum_{i=n+1}^{n_T} R_{n,i} F_M (x_i - \bar{x}_i) +$$

$$\sum_{i=1}^{n_R} K_{n,i} n_i^{(f)} - \sigma_n \sum_{i=1}^{n} A_{n,i} F_M x_i$$

$$= R_{n,n} F_M x_n + \tilde{n}_n$$

The processing may be replaced with subcarrier-by-subcarrier soft interference cancellation processing, for example, as shown in formula (14b).

$$\tilde{y}_{n,k} = \breve{y}_{n,k} - \sum_{i=n}^{n_T} [R_k]_{n,i} \bar{x}_{i,k}^{(f)}, k=1, \ldots, M \quad (14b)$$

$\tilde{n}_n$ is residual interference and a noise item after the interference cancellation, for example, as shown in formula (15).

$$\tilde{n}_n = \left( \sum_{i=n+1}^{n_T} R_{n,i} F_M (x_i - \bar{x}_i) + \sum_{i=1}^{n_R} K_{n,i} n_i^{(f)} - \sigma_n \sum_{i=1}^{n} A_{n,i} F_M x_i \right) \quad (15.)$$

It is easily known that elements in the vector $\tilde{n}_n$ are irrelevant, so its covariance matrix $\sigma_{\tilde{n}_n}^2$ is a diagonal matrix, and formula (16) may be obtained through simple deduction.

$$\sigma_{\tilde{n}_n}^2 = \sum_{i=n+1}^{n_T} R_{n,i} R_{n,i}^H \bar{v}_i + \sigma_n^2 \left( \sum_{i=1}^{n_R} K_{n,i} K_{n,i}^H + \sum_{i=1}^{n} A_{n,i} A_{n,i}^H \right) \quad (16.)$$

$$= \sum_{i=n+1}^{n_T} + R_{n,i} R_{n,i}^H \bar{v}_i + \sigma_n^2 I_M$$

$$= \begin{bmatrix} \sigma_n^2 + \sum_{i=n+1}^{n_T} (|[R_1]_{n,i}|^2 \bar{v}_i) & & \\ & \ddots & \\ & & \sigma_n^2 + \sum_{i=n+1}^{n_T} (|[R_M]_{n,i}|^2 \bar{v}_i) \end{bmatrix}$$

Therefore, $\tilde{y}_n$ is an output of an $n^{th}$ stream $x_n$ through an equivalent additive Gaussian white noise channel.

In the following, MMSE equalization with a priori information is performed on the signal $\tilde{y}_n$ after the soft interference cancellation of an $n^{th}$ transmitted data stream. In consideration of the calculation complexity, a priori variances of all subcarrier symbols within one sent symbol block of the $n^{th}$ transmitted data stream are set to be the same, and set to be $\bar{v}_n$, which is obtained by averaging a priori variances of all time domain symbols within the sent symbol block, that is, $$\bar{v}_n = \frac{1}{M} \sum_{m=1}^{M} v_{n,m}.$$

$v_{n,m}$ is an a priori variance of an $m^{th}$ symbol within a current symbol block of the $n^{th}$ transmitted data stream. A deduction process is omitted. After the MMSE equalization, an obtained timeslot symbol estimated value is as shown in formula (17).

$$\hat{x}_n = \text{diag}(\rho_n^{-1})F_M^H R_{n,n}^H \left( R_{n,n} R_{n,n}^H \bar{v}_n + \sigma_{\tilde{n}_n}^2 \right)^{-1} \tilde{y} + \bar{x}_n \quad (17.)$$

where $\rho_n[\rho_{n,1}, \rho_{n,2}, \ldots, \rho_{n,M}]^T$, and $\rho_n^{-1}[\rho_{n,1}^{-1}, \rho_{n,2}^{-1}, \ldots, \rho_{n,M}^{-1}]^T$.

$$\rho_{n,m} = e_m^H F_M^H R_{n,n}^H \left( R_{n,n} R_{n,n}^H \bar{v}_n + \sigma_{\tilde{n}_n}^2 \right)^{-1} R_{n,n} F_M e_m, m = 1, \ldots, M$$

is an equalized equivalent amplitude of an $m^{th}$ timeslot symbol within the current symbol block of the $n^{th}$ transmitted data stream. Due to characteristics of diagonal matrices of $R_{n,n}$ and $\sigma_{\tilde{n}_n}^2$, $$R_{n,n}^H \left( R_{n,n} R_{n,n}^H \bar{v}_n + \sigma_{\tilde{n}_n}^2 \right)^{-1} R_{n,n}$$

is still a diagonal matrix. Therefore, $$F_M^H R_{n,n}^H \left( R_{n,n} R_{n,n}^H \bar{v}_n + \sigma_{\tilde{n}_n}^2 \right)^{-1} R_{n,n} F_M$$

is a cyclic matrix. Because diagonal elements of a cyclic matrix are equal, further formula (18) is as follows.

$$\rho_{n,1} = \rho_{n,2} = \cdots \rho_{n,M} = \frac{1}{M} \sum_{k=1}^{M} \frac{|[R_k]_{n,n}|^2}{\sum_{i=n}^{N_T} (|[R_k]_{n,i}|^2 \bar{v}_i) + \sigma_n^2} \quad (18.)$$

It indicates that all $\rho$ within one single carrier symbol block are the same, so that $\rho_n$ is used for representation in the following. An equivalent noise variance in a time domain symbol after equalization may be further obtained, as shown in formula (19).

$$\sigma_{\hat{x}_n}^2 = \rho_n^{-1} - \bar{v}_n \quad (19.)$$

Similarly, a reverse matrix $$\left( R_{n,n} R_{n,n}^H \bar{v}_n + \sigma_{\tilde{n}_n}^2 \right)^{-1}$$

operation may also be simplified as formula (20).

$$\left( R_{n,n} R_{n,n}^H \bar{v}_n + \sigma_{\tilde{n}_{(n_i)}}^2 \right)^{-1} = \quad (20.)$$

$$\begin{bmatrix} \frac{1}{\sum_{i=n}^{n_T} |[R_1]_{n,i}|^2 \bar{v}_i + \sigma_n^2} & & \\ & \ddots & \\ & & \frac{1}{\sum_{i=n}^{n_T} |[R_M]_{n,i}|^2 \bar{v}_i + \sigma_n^2} \end{bmatrix}$$

Therefore, equalized filtering (formula 17) processing may also be implemented equivalently as follows.

51: Subcarrier-by-subcarrier single-tap frequency domain equalization processing is, for example, as shown in formula (21).

$$\hat{x}_{n,k}^{(f)} = \rho_n^{-1} \left( \frac{[R_k]_{n,n}^* \tilde{y}_{n,k}}{\sum_{i=n}^{N_T} |[R_k]_{n,i}|^2 \bar{v}_i + \sigma_n^2} \right) + \bar{x}_{n,k}^{(f)}, k = 1, \ldots, M \quad (21.)$$

52: Perform IDFT to a time domain to obtain the time domain symbol after equalization, for example, as shown in formula (22).

$$\hat{x}_n = F_M^H \cdot \hat{x}_n^{(f)} \quad (22.)$$

The foregoing subcarrier-by-subcarrier processing manner facilitates implementation.

The foregoing process is performed $n^T$ times, which is referred to iteration once, so that $n^T$ transmitted data streams are detected.

It may be seen from the foregoing iteration detection process that, in order to provide a priori information for subsequent streams or subsequent iteration detection, a mean of a sent symbol and a variance of the sent symbol are specifically included. After a time domain equalized symbol of each stream is obtained, the mean of the sent symbol and the variance of the sent symbol need to be reconstructed, based on consideration of various simplified designs of an optimal algorithm, specifically various algorithms exist. In the following, a reconstruction method suitable for iteration within a detector is specifically provided.

An example of calculation of a mean of a sent symbol $x_{n,m}$ and a variance of the sent symbol $x_{n,m}$ is taken for illustration. It is set an equivalent Gaussian model of $\hat{x}_{n,m}$ after equalization is as shown in formula (23).

$$\hat{x}_{n,m} = \bar{x}_{n,m} + n_{n,m} \quad (23.)$$

It is usually assumed that equivalent noise $n_{n,m}$ has Gaussian distribution. It may be known from the foregoing deduction process that, a variance is $\sigma_{\hat{x}_n}^2 = \rho_n^{-1} - \bar{v}_n$, and accordingly, an a posteriori probability of the sent symbol may be calculated, as shown in formula (24).

$$p(x_{n,m} | \hat{x}_{n,m}) = \frac{p(x_{n,m}, \hat{x}_{n,m})}{p(\hat{x}_{n,m})} = \frac{p(\hat{x}_{n,m} | x_{n,m})P(x_{n,m})}{\sum_{x_{n,m} \in X} p(\hat{x}_{n,m} | x_{n,m})P(x_{n,m})} \quad (24.)$$

$$= \frac{p(\hat{x}_{n,m} | x_{n,m})}{\sum_{x_{n,m} \in X} p(\hat{x}_{n,m} | x_{n,m})}$$

-continued $$= \frac{\exp\left(-\frac{|\hat{x}_{n,m} - x_{n,m}|^2}{\sigma_{\hat{x}_n}^2}\right)}{\sum_{x_{n,m} \in X} \exp\left(-\frac{|\hat{x}_{n,m} - x_{n,m}|^2}{\sigma_{\hat{x}_n}^2}\right)},$$

x represents a modulation constellation set of the sent symbol, p(.) represents a probability density function, and further calculation may be performed to obtain a mean $\bar{x}_{n,m}$ of a symbol $x_{n,m}$ and a variance $v_{n,m}$ of the symbol $x_{n,m}$, as shown in formula (25).

$$\bar{x}_{n,m} = \sum_{x_{n,m} \in X} x_{n,m} P(x_{n,m} | \hat{x}_{n,m}) \quad (25.)$$

$$v_{n,m} = \sum_{x_{n,m} \in X} |x_{n,m}|^2 P(x_{n,m} | \hat{x}_{n,m}) - |\bar{x}_{n,m}|^2$$

Perform DFT transform on a vector $\bar{X}_n$ formed of $\{\bar{x}_{n,m}\}_{m=1}^M$ within one single carrier symbol of an $n^{th}$ stream to obtain a frequency domain symbol mean $\bar{x}_n^{(f)} = F_M \bar{x}_n$ required in soft interference cancellation equalization.

Figure 5:
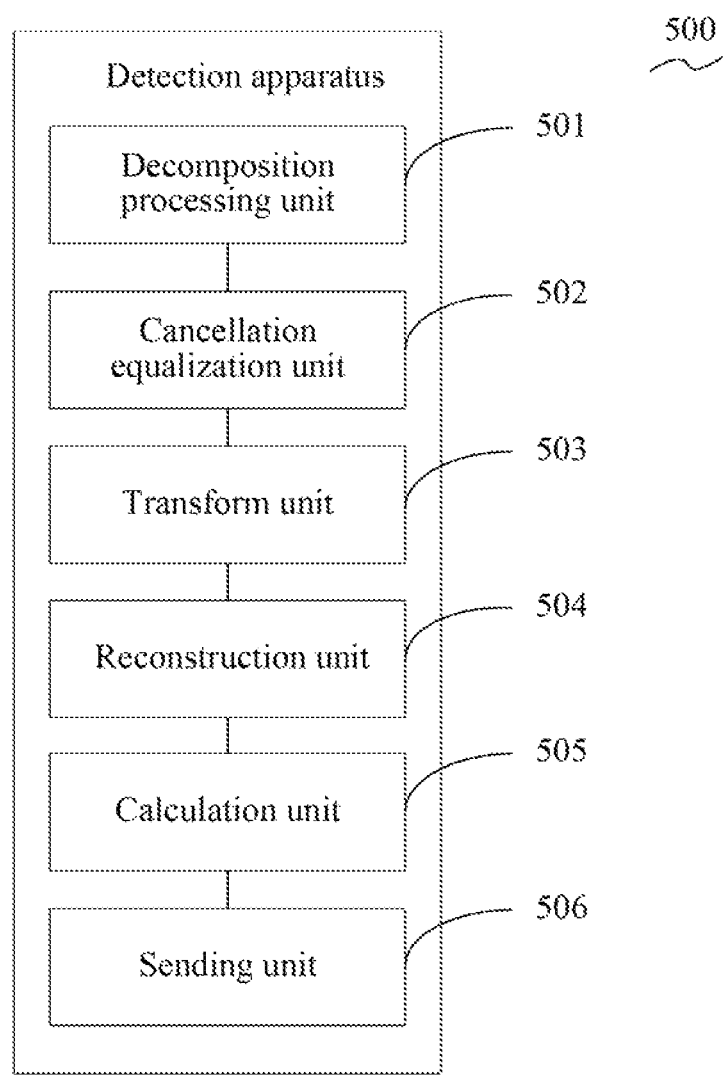
FIG. 5 is a schematic structural diagram of a detection apparatus according to another embodiment of the present invention.

In another embodiment of the present invention, a detection apparatus is further disclosed. As shown in FIG. 5, a detection apparatus 500 includes: a decomposition processing unit 501, a cancellation equalization unit 502, a transform unit 503, a reconstruction unit 504, a calculation unit 505, and a sending unit 506.

The decomposition processing unit 501 is configured to perform MMSE-SQRD decomposition on an equivalent channel matrix of a frequency domain to obtain a preprocessing matrix and a block upper triangular matrix, and perform processing on a frequency domain received signal by using the preprocessing matrix.

The cancellation equalization unit 502 is configured to reconstruct a priori information of a fed back sent symbol by using a mean and a variance, and perform, layer by layer, soft interference cancellation equalization which is based on a minimum mean squared error on a sent symbol block which is on each stream.

The transform unit 503 is configured to perform inverse fast Fourier transform on a frequency domain equalized symbol to a time domain.

The reconstruction unit 504 is configured to reconstruct an a posteriori mean of the sent symbol and an a posteriori variance of the sent symbol and transform them to the frequency domain, use them as a priori information to continue performing soft interference cancellation equalization on another stream or subsequent iteration.

The calculation unit 505 is configured to, after iterative interference cancellation equalization is finished, calculate a log-likelihood ratio of a bit of the sent symbol.

The sending unit 506 is configured to send the log-likelihood ratio of the bit of the sent symbol to a channel decoder for channel decoding.

Figure 6:
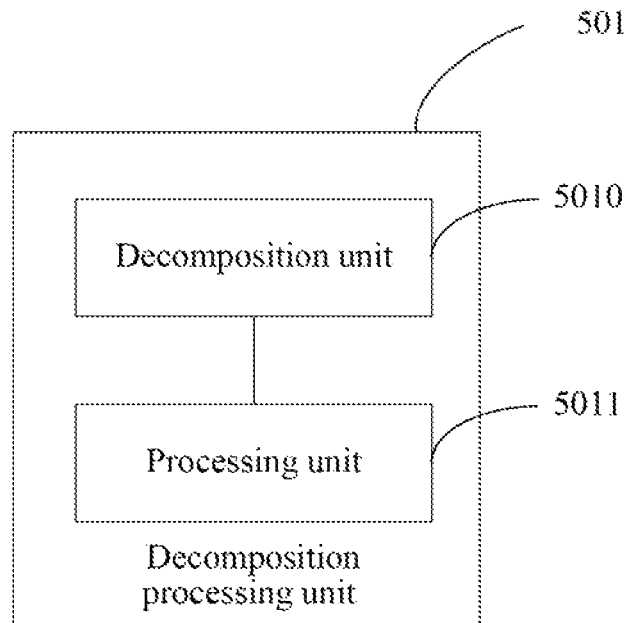
FIG. 6 is a schematic structural diagram of a decomposition processing unit according to another embodiment of the present invention.

In another embodiment of the present invention, as shown in FIG. 6, the decomposition processing unit 501 further includes a decomposition unit 5010 and a processing unit 5011 that are connected to each other. The decomposition unit 5010 is configured to perform MMSE-SQRD decomposition on an equivalent frequency domain channel matrix by using a modified Gram-Schmidt orthogonalization algorithm. The processing unit 5011 is configured to perform preprocessing on the frequency domain received signal subcarrier by subcarrier by using the preprocessing matrix obtained through decomposition.

Figure 7:
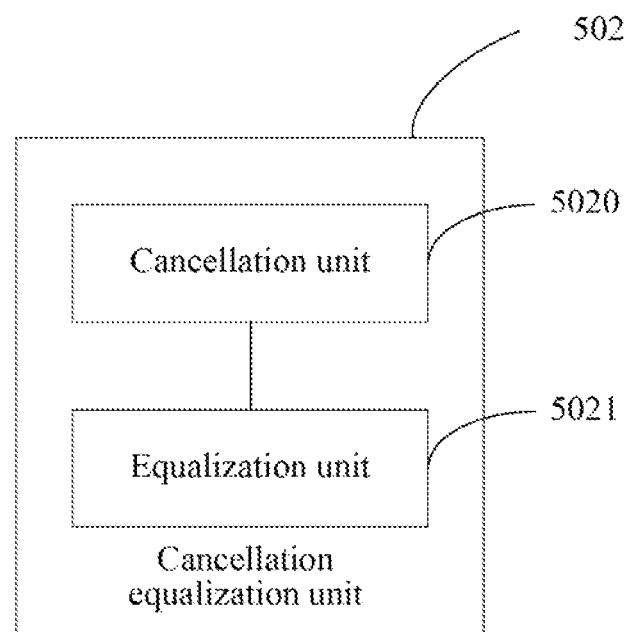
FIG. 7 is a schematic structural diagram of a cancellation equalization unit according to another embodiment of the present invention.

In another embodiment of the present invention, as shown in FIG. 7, the cancellation equalization unit 502 further includes a cancellation unit 5020 and an equalization unit 5021 that are connected to each other. The cancellation unit 5020 is configured to perform soft interference cancellation subcarrier by subcarrier on a preprocessed received signal corresponding to an $n^{th}$ transmitted data stream. The equalization unit 5021 is configured to perform frequency domain equalization processing on a current single carrier symbol of the $n^{th}$ transmitted data stream.

Figure 8:
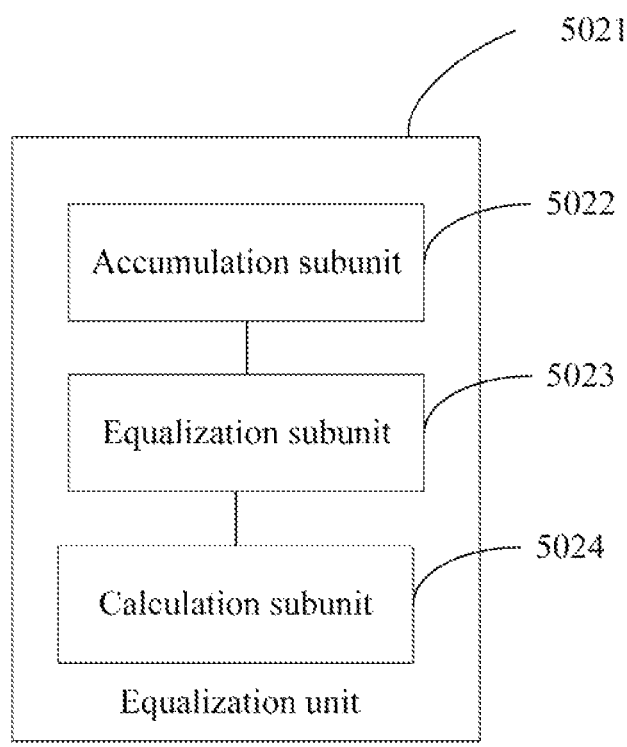
FIG. 8 is a schematic structural diagram of an equalization unit according to another embodiment of the present invention.

In another embodiment of the present invention, as shown in FIG. 8, the equalization unit 5021 further includes an accumulation subunit 5022, an equalization subunit 5023, and a calculation subunit 5024 that are connected to each other. The accumulation subunit 5022 is configured to perform accumulating and equalizing subcarrier by subcarrier to obtain a time domain symbol amplitude. The equalization subunit 5023 is configured to perform, subcarrier by subcarrier, MMSE equalization processing on a signal after the soft interference cancellation. The calculation subunit 5024 is configured to calculate normalized residual interference and a noise variance of an equalized output time domain symbol.

For processing processes of the foregoing apparatuses, units or subunits and formulas to be executed, reference may be made to contents disclosed in the foregoing embodiments, and details are not repeatedly described here.

It may be known from the foregoing processes and processing procedures that, through the MMSE-SQRD decomposition, the matrix inverse operation in the MMSE equalization is avoided, so that the complexity is significantly reduced. In addition, through the layer-by-layer soft interference cancellation detection after the SQRD decomposition and further iterative processing, better detection performance may be obtained. Especially, the inter-stream interference suppression may be performed in first iteration. Compared with a conventional parallel iterative soft interference cancellation detection algorithm, with the same number of times of iteration, especially under the limit that practically a receiver can only support a small number of times of iteration, the inter-stream interference suppression has more evident advantages, and an advantage in the aspect of cost performance is obvious.

Persons skilled in the art may clearly know that, for convenience and simplicity of description, for specific work processes of the foregoing systems, apparatuses, and units, reference may be made to corresponding processes in the foregoing method embodiments, and details are not repeatedly described here.

The described systems, apparatuses, and methods and schematic diagrams of different embodiments may be combined or integrated with other systems, units, technologies or methods without departing from the scope of the application. Furthermore, shown or discussed mutual coupling or direct coupling or communication connection may be implemented through some interfaces, and indirect coupling or communication connection between apparatuses or units may be electrical, mechanical or in other forms.

Through the foregoing description of the embodiments, persons skilled in the art may clearly know that, the present invention may be implemented through software plus a necessary universal hardware platform, and of course, may be implemented through hardware, but in most cases, the former is a preferred implementation manner. Based on such understanding, the essence of the technical solutions of the present invention or the part that makes contributions to the prior art may be embodied in the form of a software product. The computer software product is stored in a storage medium, and includes several instructions to instruct a computer device (which may be a personal computer, a server, or a network device, and so on) to perform all or part of steps of the method in the embodiments of the present invention. The foregoing storage medium may include any medium that is capable of storing program codes, such as a USB flash drive, a removable hard disk, a read-only memory (ROM), a random access memory (RAM), a magnetic disk or an optical disk In the several embodiments provided in the application, it should be understood that, the disclosed systems, apparatuses, and methods may be embodied in other forms. For example, the foregoing described apparatus embodiments are only illustrative. For example, dividing of the units are only a kind of logical function dividing, and there may be other dividing manners during practical implementation. For example, multiple units or components may be combined or integrated into another system or some features may be omitted and may not be executed. Units described as separate components may be or may not be physically separated. Components shown as units may be or may not be physical units, that is, may be located in one place, or may also be distributed to a plurality of network units. Some or all of the units may be selected, according to actual needs, to achieve the objective of the solutions of the embodiments. Persons of ordinary skill in the art may understand and implement the present invention without creative efforts.

In addition, the functional units in the embodiments of the present invention may be integrated in a processing unit, each unit may also exist separately and physically, and two or more than two units may also be integrated in one unit. The foregoing integrated units may be implemented in the form of hardware, and may also be implemented in the form of a software functional unit. If implemented in the form of a software functional unit and sold or used as an independent product, the integrated units may also be stored in a computer readable storage medium.

The foregoing description are merely specific implementation manners of the present invention, but not intended to limit the scope of the present invention. Any variations or replacement that may be easily derived by those skilled in the art within the technical scope disclosed in the present invention shall fall within the protection scope of the present invention. Therefore, the protection scope of the present invention is subject to the protection scope of the appended claims.

What is claimed is:

1. A detection method in a multiple-input multiple-output single-carrier block transmission system, comprising:
performing fast Fourier transform on a received signal, and after transforming the received signal to a frequency domain, performing subcarrier demapping;
performing sorted QR decomposition (Sorted QR Decomposition, SQRD) decomposition that is based on a minimum mean squared error (Minimum Mean Squared Error, MMSE) criterion on an equivalent channel matrix of the frequency domain, obtaining a preprocessing matrix and a block upper triangular matrix, and performing preprocessing on a frequency domain received signal by using the preprocessing matrix;
reconstructing a priori information of a fed back sent symbol by using a mean and a variance, and performing, layer by layer, soft interference cancellation equalization which is based on a minimum mean squared error on a sent symbol block which is on each stream;
performing inverse fast Fourier transform on a frequency domain equalized symbol to a time domain, reconstructing an a posteriori mean of the sent symbol and an a posteriori variance of the sent symbol, transforming them to the frequency domain, and using them as a priori information to continue performing soft interference cancellation equalization on another stream or subsequent iteration;
after finishing iterative interference cancellation equalization, calculating a log-likelihood ratio of a bit of the sent symbol; and
sending the log-likelihood ratio of the bit of the sent symbol to a channel decoder for channel decoding.

2. The method according to claim 1, further comprising:
performing MMSE-SQRD decomposition on an equivalent frequency domain channel matrix by using a modified Gram-Schmidt (Gram-Schmidt) orthogonalization algorithm; and
performing preprocessing on the frequency domain received signal subcarrier by subcarrier by using the preprocessing matrix obtained through decomposition.

3. The method according to claim 2, wherein the performing MMSE-SQRD decomposition on an equivalent frequency domain channel matrix by using a modified Gram-Schmidt orthogonalization method specifically comprises:
performing MMSE-SQRD decomposition subcarrier by subcarrier on an equivalent channel matrix $$\underline{\Lambda}_k = \begin{bmatrix} \Lambda_k \\ \sigma_n I_{n_T} \end{bmatrix}, k = 1, \ldots, M$$

according to an formula $$\underline{\Lambda}_k = \underline{U}_k R_k = \begin{bmatrix} P_k \\ T_k \end{bmatrix} R_k$$

to obtain: a column orthogonal matrix $\underline{U}_k$ and an upper triangular matrix $R_k$, wherein $\underline{U}_k$ is a column orthogonal matrix at a level $(n_R+n_T) \times n^T$, $R_k$ is an upper triangular matrix at a level $n_R \times n_T$; and $P_k$ is a preprocessing matrix at a level $n_R \times n_T$, and $T_k$ is an upper triangular matrix;
wherein M represents the length of a single carrier symbol block, that is, the number of subcarriers, k represents a subcarrier serial number, $\sigma_n$ represents noise power in the received signal, $I_{n_T}$ represents a unit matrix with the size $n_T \times n_T$, $\Lambda_k$ is a channel matrix on a $k^{th}$ subcarrier, $n_T$ and $n_R$ respectively represent the number of transmitting antennas and the number of receiving antennas, and M represents the length of the single carrier symbol block.

4. The method according to claim 2, wherein the perform preprocessing on the frequency domain received signal subcarrier by subcarrier by using the preprocessing matrix obtained through decomposition specifically comprises:
performing preprocessing on the frequency domain received signal according to a formula $$\acute{y}_k = P_k^H y_k^{(f)}, k=1,\ldots,M;$$

wherein M represents the length of a single carrier symbol block, that is, the number of subcarriers, k represents a subcarrier serial number, $y_k^{(f)}$ represents a frequency domain received signal on a $k^{th}$ subcarrier, $P_k$ is a preprocessing matrix which is on a $k^{th}$ subcarrier and obtained through the MMSE-SQRD, and $\breve{y}_k$ is a preprocessed received signal on the $k^{th}$ subcarrier.

5. The method according to claim 1, further comprising:
performing soft interference cancellation subcarrier by subcarrier on a preprocessed received signal corresponding to an $n^{th}$ transmitted data stream; and
performing frequency domain equalization processing on a current single carrier symbol of the $n^{th}$ transmitted data stream.

6. The method according to claim 5, wherein the performing soil interference cancellation processing subcarrier by subcarrier on a preprocessed received signal corresponding to an $n^{th}$ transmitted data stream specifically comprises:
according to a formula $$\tilde{y}'_{n,k} = \acute{y}_{n,k} - \sum_{i=n}^{n_T} [R_k]_{n,i} \bar{x}^{(f)}_{i,k}, k = 1, 6, M,$$

performing soft interference cancellation processing subcarrier by subcarrier on the preprocessed received signal corresponding to the $n^{th}$ transmitted data stream;
wherein M represents the length of a single carrier symbol block, k represents a subcarrier serial number, $_{n,k}$ represents a received signal on a $k^{th}$ subcarrier corresponding to an $n^{th}$ stream, $[R_k]_{n,n}$ is an equivalent channel coefficient of a preprocessed $n^{th}$ stream, $[R_k]_{n,i}$, i≠n, is an interference coefficient of a preprocessed $i^{th}$ stream on the $n^{th}$ stream, $\bar{x}_{i,k}^{(f)}$ is an a posteriori mean which is of a $k^{th}$ subcarrier symbol and obtained by reconstructing an $i^{th}$ stream mean and transforming it to the frequency domain, and $\tilde{y}_{n,k}$ is a received signal on the $k^{th}$ subcarrier corresponding to the $n^{th}$ stream after the soft interference cancellation.

7. The method according to claim 5, wherein the performing frequency domain equalization processing on a current single carrier symbol of the $n^{th}$ transmitted data stream specifically comprises:
performing accumulating and equalizing subcarrier by subcarrier to obtain a time domain symbol amplitude;
performing MMSE equalization processing subcarrier by subcarrier on a signal after soft interference cancellation; and
calculating normalized residual interference and a noise variance of an equalized output time domain symbol.

8. The method according to claim 7, wherein the performing frequency domain equalization processing on a current single carrier symbol of the $n^{th}$ transmitted data stream specifically comprises:
performing accumulating and equalizing subcarrier by subcarrier according to the following formula to obtain the time domain symbol amplitude;

$$\rho_n = \frac{1}{M} \sum_{k=1}^{M} \frac{|[R_k]_{n,n}|^2}{\sum_{i=n}^{n_T} |[R_k]_{n,i}|^2 \bar{v}_i + \sigma_n^2}$$

wherein M represents the length of a single carrier symbol block, $n_T$ represents the number of transmitting antennas, $[R_k]_{n,n}$ is an equivalent channel coefficient of a preprocessed $n^{th}$ stream, $[R_k]_{n,i}$, i≠n, is an interference coefficient of a preprocessed $i^{th}$ stream on the $n^{th}$ stream, $\bar{v}_i$ is an a posteriori variance which is of a frequency domain symbol of an $i^{th}$ stream and obtained through reconstruction, $\sigma_n^2$ is noise power, and $\rho_n$ is a time domain symbol amplitude after the current single carrier symbol of the $n^{th}$ stream is equalized;
according to the following formula, performing MMSE equalization processing subcarrier by subcarrier on a signal after the soft interference cancellation;

$$\hat{x}^{(f)}_{n,k} = \rho_n^{-1} \frac{[R_k]^*_{n,n} \tilde{y}'_{n,k}}{\sum_{i=n}^{n_T} |[R_k]_{n,i}|^2 \bar{v}_i + \sigma_n^2} + \bar{x}^{(f)}_{n,k}, k = 1, 6, M$$

wherein M represents the length of the single carrier symbol block; k represents the subcarrier serial number, $n^T$ represents the number of transmitting antennas, $[R_k]_{n,n}$ is the equivalent channel coefficient of the preprocessed $n^{th}$ stream, $[R_k]_{n,i}$, i≠n, is the interference coefficient of the preprocessed $i^{th}$ stream on the $n^{th}$ stream, $\bar{v}_i$ is the a posteriori variance which is of the frequency domain symbol of the $i^{th}$ stream and obtained through reconstruction, $\sigma_n^2$ is the noise power, $\tilde{y}_{n,k}$ is a signal after performing soft interference cancellation subcarrier by subcarrier on the preprocessed received signal corresponding to the $n^{th}$ transmitted data stream, $\bar{x}_{n,k}^{(f)}$ is an a posteriori mean which is of a $k^{th}$ subcarrier symbol and obtained by reconstructing an $n^{th}$ transmitted data stream mean and transforming it to the frequency domain, and $\rho_n^{-1}$ is a reciprocal of the time domain symbol amplitude after the current single carrier symbol of the $n^{th}$ stream is equalized;
according to the following formula, calculating the normalized residual interference and the noise variance of the equalized output time domain symbol;

$$\sigma_{\hat{x}_n}^2 = \rho_n^{-1} - \bar{v}_n$$

wherein $\bar{v}_n$ is an a posteriori variance which is of the frequency domain symbol of the $i^{th}$ stream and obtained through reconstruction, and $\sigma_{\hat{x}_n}^2$ is the normalized residual interference and noise variance after the current single carrier symbol of the $n^{th}$ stream is equalized.

9. The method according to claim 5, wherein the performing frequency domain equalization processing on a current single carrier symbol of the $n^{th}$ transmitted data stream specifically comprises:
according to the following formula, performing accumulating and equalizing subcarrier by subcarrier to obtain a time domain symbol amplitude;

$$\rho_n = \frac{1}{M} \sum_{k=1}^{M} \frac{|[R_k]_{n,n}|^2}{\sum_{i=n}^{n_T} |[R_k]_{n,i}|^2 \bar{v}_i + \sigma_n^2}$$

wherein M represents the length of a single carrier symbol block, $n^T$ represents the number of transmitting antennas, $[R_k]_{n,n}$ is an equivalent channel coefficient of a preprocessed $n^{th}$ stream, $[R_k]_{n,i}$, i≠n, is an interference coefficient of a preprocessed $i^{th}$ stream on the $n^{th}$ stream, $\bar{v}_i$ is an a posteriori variance which is of a frequency domain symbol of an $i^{th}$ stream and obtained through reconstruction, $\sigma_n^2$ is noise power, and $\rho_n$ is a time domain symbol amplitude after the current single carrier symbol of the $n^{th}$ stream is equalized;

according to the following formula, performing MMSE equalization processing subcarrier by subcarrier on a signal after the soft interference cancellation;

$$\hat{x}_{n,k}^{(f)} = \rho_n^{-1} \frac{[R_k]_{n,n}^* \tilde{y}_{n,k}}{\sum_{i=n}^{n_T} |[R_k]_{n,i}|^2 \bar{v}_i + \sigma_n^2} + \bar{x}_{n,k}^{(f)}, k = 1, 6, M$$

wherein M represents the length of the single carrier symbol block, k represents a subcarrier serial number, $n^T$ represents the number of transmitting antennas, $[R_k]_{n,n}$ is the equivalent channel coefficient of the preprocessed $n^{th}$ stream, $[R_k]_{n,i}$, i≠n, is the interference coefficient of the preprocessed $i^{th}$ stream on the $n^{th}$ stream, $\bar{v}_i$ is the a posteriori variance which is of the frequency domain symbol of the $i^{th}$ stream and obtained through reconstruction, $\sigma_n^2$ is the noise power, $\tilde{y}_{n,k}$ is a signal after performing soft interference cancellation subcarrier by subcarrier on the preprocessed received signal corresponding to the $n^{th}$ transmitted data stream, and $\rho_n^{-1}$ is a reciprocal of the time domain symbol amplitude after the current single carrier symbol of the $n^{th}$ stream is equalized;

according to the following formula, calculating normalized residual interference and a noise variance of an equalized output time domain symbol;

$$\sigma_{\hat{x}_n}^2 = \rho_n^{-1} - 1$$

wherein $\bar{v}_n$ is an a posteriori variance which is of the frequency domain symbol of the $i^{th}$ stream and obtained through reconstruction, and $\sigma_{\hat{x}_n}^2$ is the normalized residual interference and noise variance after the current single carrier symbol of the $n^{th}$ stream is equalized.

10. The method according to claim 1, wherein the performing inverse fast Fourier transform on a frequency domain equalized symbol to a time domain specifically comprises:
performing inverse discrete Fourier transform on a frequency domain equalized symbol vector of the current single carrier symbol of an $n^{th}$ transmitted data stream to obtain a time domain symbol after equalization.

11. A receiver, comprising: an FFT unit, a subcarrier demapping unit, a channel estimation unit, a detection unit, and a channel decoder; wherein,
the FFT unit is configured to perform fast Fourier transform on a received signal;
the subcarrier demapping unit is configured to perform subcarrier demapping on a transformed frequency domain signal;
the channel estimation unit is configured to perform channel estimation and noise power estimation on a pilot portion in the received signal, and send an estimated signal together with the frequency domain received signal to the detection unit;
the detection unit is configured to perform MMSE-SQRD decomposition on an equivalent channel matrix of a frequency domain, obtain a preprocessing matrix and a block upper triangular matrix, and perform processing on the frequency domain received signal by using the preprocessing matrix; reconstruct a priori information of a fed back sent symbol by using a mean and a variance, perform, layer by layer, soft interference cancellation equalization which is based on a minimum mean squared error on a sent symbol block which is on each stream; perform inverse fast Fourier transform on a frequency domain equalized symbol to a time domain, reconstruct an a posteriori mean of the sent symbol and an a posteriori variance of the sent symbol, transform them to the frequency domain, and use them as a priori information to continue performing soft interference cancellation equalization on another stream or subsequent iteration; after iterative interference cancellation equalization is finished, calculate a log-likelihood ratio of a bit of the sent symbol; and send the log-likelihood ratio of the bit of the sent symbol to a channel decoder for channel decoding.

12. The receiver according to claim 11, further comprising:
a CP removing unit, configured to perform, according to a symbol synchronization amount, cyclic prefix (CP) removal processing on received signals which are on multiple receiving antennas.

13. The receiver according to claim 11, wherein the detection unit is further configured to perform MMSE-SQRD decomposition on an equivalent frequency domain channel matrix by using a modified Gram-Schmidt orthogonalization algorithm; and perform preprocessing on the frequency domain received signal subcarrier by subcarrier by using the obtained preprocessing matrix.

14. The receiver according to claim 11, wherein the detection unit is further configured to perform soft interference cancellation subcarrier by subcarrier on a preprocessed received signal corresponding to an $n^{th}$ transmitted data stream; and perform frequency domain equalization processing on a current single carrier symbol of the $n^{th}$ transmitted data stream.

15. The receiver according to claim 14, wherein the detection unit is further configured to perform accumulating and equalizing subcarrier by subcarrier to obtain a time domain symbol amplitude; perform, subcarrier by subcarrier, MMSE equalization processing on a signal after the soft interference cancellation; and calculate normalized residual interference and a noise variance of an equalized output time domain symbol.

16. A detection apparatus, comprising:
a decomposition processing unit, configured to perform MMSE-SQRD decomposition on an equivalent channel matrix of a frequency domain, obtain a preprocessing matrix and a block upper triangular matrix, and perform processing on a frequency domain received signal by using the preprocessing matrix;
a cancellation equalization unit, configured to reconstruct a priori information of a fed back sent symbol by using a mean and a variance, and perform, layer by layer, soft interference cancellation equalization which is based on a minimum mean squared error on a sent symbol block which is on each stream;
a transform unit, configured to perform inverse fast Fourier transform on a frequency domain equalized symbol to a time domain;
a reconstruction unit, configured to reconstruct an a posteriori mean of the sent symbol and an a posteriori variance of the sent symbol, transform them to the frequency domain, and use them as a priori information to continue performing soft interference cancellation equalization on another stream or subsequent iteration;
a calculation unit, configured to, after iterative interference cancellation equalization is finished, calculate a log-likelihood ratio of a bit of the sent symbol; and
a sending unit, configured to send the log-likelihood ratio of the bit of the sent symbol to a channel decoder for channel decoding.

17. The detection apparatus according to claim 16, wherein the decomposition processing unit further comprises:
- a decomposition unit, configured to perform MMSE-SQRD decomposition on an equivalent frequency domain channel matrix by using a modified Gram-Schmidt orthogonalization algorithm; and
- a processing unit, configured to perform preprocessing on the frequency domain received signal subcarrier by subcarrier by using the preprocessing matrix obtained through decomposition.

18. The detection apparatus according to claim 16, wherein the cancellation equalization unit further comprises:
- a cancellation unit, configured to perform soft interference cancellation subcarrier by subcarrier on a preprocessed received signal corresponding to an $n^{th}$ transmitted data stream; and
- an equalization unit, configured to perform frequency domain equalization processing on a current single carrier symbol of the $n^{th}$ transmitted data stream.

19. The detection apparatus according to claim 18, wherein the equalization unit further comprises:
- an accumulation subunit, configured to perform accumulating and equalizing subcarrier by subcarrier to obtain a time domain symbol amplitude;
- an equalization subunit, configured to perform, subcarrier by subcarrier, MMSE equalization processing on a signal after the soft interference cancellation; and
- a calculation subunit, configured to calculate normalized residual interference and a noise variance of an equalized output time domain symbol.

* * * * *

UNITED STATES PATENT AND TRADEMARK OFFICE
CERTIFICATE OF CORRECTION

PATENT NO. : 8,811,145 B2
APPLICATION NO. : 13/544640
DATED : August 19, 2014
INVENTOR(S) : Wenjin Wang et al.

It is certified that error appears in the above-identified patent and that said Letters Patent is hereby corrected as shown below:

In the claims

Claim 6, Column 21, Line 11:

Before "interference" delete "soil", and insert --soft--, therefor.

Claim 4, Column 20, Line 61:

Delete " $\breve{y}_k = P_k^H y_k^{(f)}, k=1,\ldots,M$ ",

Insert -- $\breve{\mathbf{y}}_k = \mathbf{P}_k^H \mathbf{y}_k^{(f)}, k=1,\cdots,M$ --, therefor.

Claim 6, Column 20, Lines 15-20:

Delete " $y'_{n,k} = y'_{n,k} - \sum_{i=n}^{n_T} [R_k]_{n,i} \bar{x}_{i,k}^{(f)}, k=1,6,M$ ", Signed and Sealed this
Thirteenth Day of October, 2015

Michelle K. Lee
*Director of the United States Patent and Trademark Office*

CERTIFICATE OF CORRECTION (continued)
U.S. Pat. No. 8,811,145 B2

Insert -- $$\tilde{\tilde{y}}_{n,k} = \breve{y}_{n,k} - \sum_{i=n}^{n_T} [\mathbf{R}_k]_{n,i} \overline{x}_{i,k}^{(f)}, k = 1, \cdots, M$$ --, therefor.

Claim 8, Column 22, Line 10:

Delete "$$\hat{x}_{n,k}^{(f)} = \rho_n^{-1} \frac{[R_k]_{n,n}^* \tilde{y}_{n,k}}{\sum_{i=n}^{n_T} |[R_k]_{n,i}|^2 \overline{v}_i + \sigma_n^2} + \overline{x}_{n,k}^{(f)}, k = 1, 6, M$$", Insert -- $$\hat{x}_{n,k}^{(f)} = \rho_n^{-1} \frac{[\mathbf{R}_k]_{n,n}^* \tilde{\tilde{y}}_{n,k}}{\sum_{i=n}^{n_T} |[\mathbf{R}_k]_{n,i}|^2 \overline{v}_i + \sigma_n^2} + \overline{x}_{n,k}^{(f)}, k = 1, \cdots, M$$ --, therefor.

Claim 9, Column 23, Lines 5-10:

Delete "$$\hat{x}_{n,k}^{(f)} = \rho_n^{-1} \frac{[R_k]_{n,n}^* \tilde{y}_{n,k}}{\sum_{i=n}^{n_T} |[R_k]_{n,i}|^2 \overline{v}_i + \sigma_n^2} + \overline{x}_{n,k}^{(f)}, k = 1, 6, M$$", Insert -- $$\hat{x}_{n,k}^{(f)} = \rho_n^{-1} \frac{[\mathbf{R}_k]_{n,n}^* \tilde{\tilde{y}}_{n,k}}{\sum_{i=n}^{n_T} |[\mathbf{R}_k]_{n,i}|^2 \overline{v}_i + \sigma_n^2}, k = 1, \cdots, M$$ --, therefor.